(12) United States Patent
Ledvina et al.

(10) Patent No.: US 11,540,137 B2
(45) Date of Patent: Dec. 27, 2022

(54) PAIRING DEVICES BASED ON DISTANCE

(71) Applicant: Apple Inc., Cupertino, CA (US)

(72) Inventors: Brent M. Ledvina, San Francisco, CA (US); Yannick L. Sierra, San Francisco, CA (US); Kyle C. Brogle, San Francisco, CA (US); Steven Andrew Myers, San Jose, CA (US)

(73) Assignee: Apple Inc., Cupertino, CA (US)

( * ) Notice: Subject to any disclaimer, the term of this patent is extended or adjusted under 35 U.S.C. 154(b) by 231 days.

(21) Appl. No.: 16/835,057

(22) Filed: Mar. 30, 2020

(65) Prior Publication Data

US 2020/0336897 A1 Oct. 22, 2020

Related U.S. Application Data

(60) Provisional application No. 62/835,216, filed on Apr. 17, 2019.

(51) Int. Cl.
| | | |
|---|---|---|
| *H04W 12/50* | (2021.01) | |
| *H04W 12/037* | (2021.01) | |
| *H04W 12/06* | (2021.01) | |
| *H04W 4/02* | (2018.01) | |
| *H04W 76/14* | (2018.01) | |
| *H04L 9/32* | (2006.01) | |
| *H04L 9/08* | (2006.01) | |

(Continued)

(52) U.S. Cl.
CPC .......... *H04W 12/50* (2021.01); *H04L 9/0866* (2013.01); *H04L 9/32* (2013.01); *H04W 4/023* (2013.01); *H04W 12/037* (2021.01); *H04W 12/06* (2013.01); *H04W 12/64* (2021.01); *H04W 76/14* (2018.02); *H04W 4/80* (2018.02)

(58) Field of Classification Search
CPC ... H04W 12/50; H04W 76/14; H04W 12/037; H04W 4/023; H04W 12/06; H04W 4/80; H04L 9/0866; H04L 9/32
See application file for complete search history.

(56) References Cited

U.S. PATENT DOCUMENTS

| | | |
|---|---|---|
| 7,506,057 B2 | 3/2009 | Bigioi et al. |
| 8,260,261 B2 | 9/2012 | Teague |
| 8,823,494 B1 | 9/2014 | Kovitz et al. |

(Continued)

FOREIGN PATENT DOCUMENTS

WO 2017181132 A2 10/2017

OTHER PUBLICATIONS

Yasir Arfat Malkani, Dan Chalmers, Ian Wakeman "A Framework for Secure Device Pairing by Demonstration of Physical Proximity", 2010 ACM, 6 pages (Year: 2010).*

(Continued)

*Primary Examiner* — Catherine Thiaw
(74) *Attorney, Agent, or Firm* — Kowert, Hood, Munyon, Rankin & Goetzel, P.C.; Dean M. Munyon

(57) ABSTRACT

Techniques disclosed herein relate to the pairing of a pairing initiator device and a pairing responder device for communication. The pairing initiator device and the pairing responder device range with each other to determine the distance between the pairing initiator device and the pairing responder device. Based on the distance being below a threshold distance, the pairing initiator device and the pairing responder device wirelessly pair with each other without further input from the user.

20 Claims, 6 Drawing Sheets

(51) Int. Cl.
H04W 12/64 (2021.01)
H04W 4/80 (2018.01)

(56) References Cited

U.S. PATENT DOCUMENTS

| | | | |
|---|---|---|---|
| 9,106,307 B2 | 8/2015 | Molettiere et al. | |
| 10,382,203 B1* | 8/2019 | Loladia | H04L 63/06 |
| 10,796,563 B1* | 10/2020 | Bell | G10L 15/22 |
| 2003/0220765 A1 | 11/2003 | Overy et al. | |
| 2007/0300070 A1* | 12/2007 | Shen-Orr | H04L 63/0823 713/176 |
| 2014/0134947 A1* | 5/2014 | Stouder-Studenmund | H04L 67/14 455/41.2 |
| 2014/0181911 A1* | 6/2014 | Kula | H04L 9/3215 726/4 |
| 2014/0235171 A1* | 8/2014 | Molettiere | A61B 5/7455 455/41.2 |
| 2016/0128114 A1* | 5/2016 | Moy | H04W 12/50 455/434 |
| 2016/0241605 A1* | 8/2016 | Taboriskiy | H04W 4/80 |
| 2016/0294822 A1* | 10/2016 | George | H04L 63/0861 |
| 2017/0201380 A1* | 7/2017 | Schaap | H04L 9/0643 |
| 2017/0359169 A1 | 12/2017 | Benson et al. | |
| 2018/0139789 A9 | 5/2018 | Agrawal | |
| 2018/0243573 A1* | 8/2018 | Yoder | A61N 1/37252 |
| 2019/0014459 A1* | 1/2019 | Zong | G06K 19/06 |
| 2019/0036688 A1* | 1/2019 | Wasily | H04L 9/0825 |
| 2019/0332787 A1* | 10/2019 | Graf | G06F 16/95 |
| 2021/0045169 A1* | 2/2021 | Pupakdee | G06F 21/445 |
| 2021/0211902 A1* | 7/2021 | Achyuth | H04W 24/04 |

OTHER PUBLICATIONS

Kevin Curran, Amanda Millar, Conor Mc Garvey "Near Field Communication", International Journal of Electrical and Computer Engineering (IJECE) vol. 2, No. 3, Jun. 2012, pp. 371-382 (Year: 2012).*
Meng Zhang, Anand Raghunathan and Niraj K. Jha "Trustworthiness of Medical Devices and Body Area Networks", 2014 IEEE vol. 102, No. 8 1174-1188 (Year: 2014).*
International Search Report and Written Opinion in PCT Appl. No PCT/US2020/028174 dated Jul. 22, 2020, 11 pages.
Hugo Krawczyk, "SIGMA: the 'SIGn-and-MAc' Approach to Authenticated Diffe-Hellman and its Use in the IKE Protocols," Conference: Advances in Cryptology—CRYPTO 2003, 23rd Annual International Cryptology Conference, Aug. 17-21, 2003, 32 pages.

* cited by examiner

PAIRING DEVICES BASED ON DISTANCE

This application claims the benefit of U.S. Provisional Application No. 62/835,216, filed Apr. 17, 2019, which is incorporated by reference herein in its entirety.

BACKGROUND

Technical Field

This disclosure relates generally to secure communication between computer systems, and more particularly to devices pairing with each other.

Description of the Related Art

Communications between different computer systems can be encrypted with a cryptographic key to ensure the security of such communication. In many security protocols, the encryption key is either shared between the two computer systems and/or mutually generated from information available to both computer systems. Before completing the process of setting up a communications link between each other, however, in many security protocols, the two computer systems first verify that their interlocutor is authentic. Moreover, once the communications link is established, many security protocols require that the devices confirm a command to establish communications such as with a shared password or code such that unintentional or fraudulent attempts to establish communications are stopped.

SUMMARY

The present disclosure concerns pairing between two devices such that the two devices can exchange messages with one another after the pairing operation is completed. One of these devices, a pairing initiator device, receives a command from a user to pair with the other device, a pairing responder device. The pairing initiator device initiates the pairing operation by communicating with the pairing responder device. After a determination is made as to the authenticity of the pairing responder device, the pairing initiator device and pairing responder device exchange communications to range with each other to determine a distance between the pairing initiator device and pairing responder device. Based on the distance being below a threshold, the pairing initiator device and pairing responder device wirelessly pair with each other without further input from the user beyond the command to pair that initiated the pairing operation.

Figure 1:
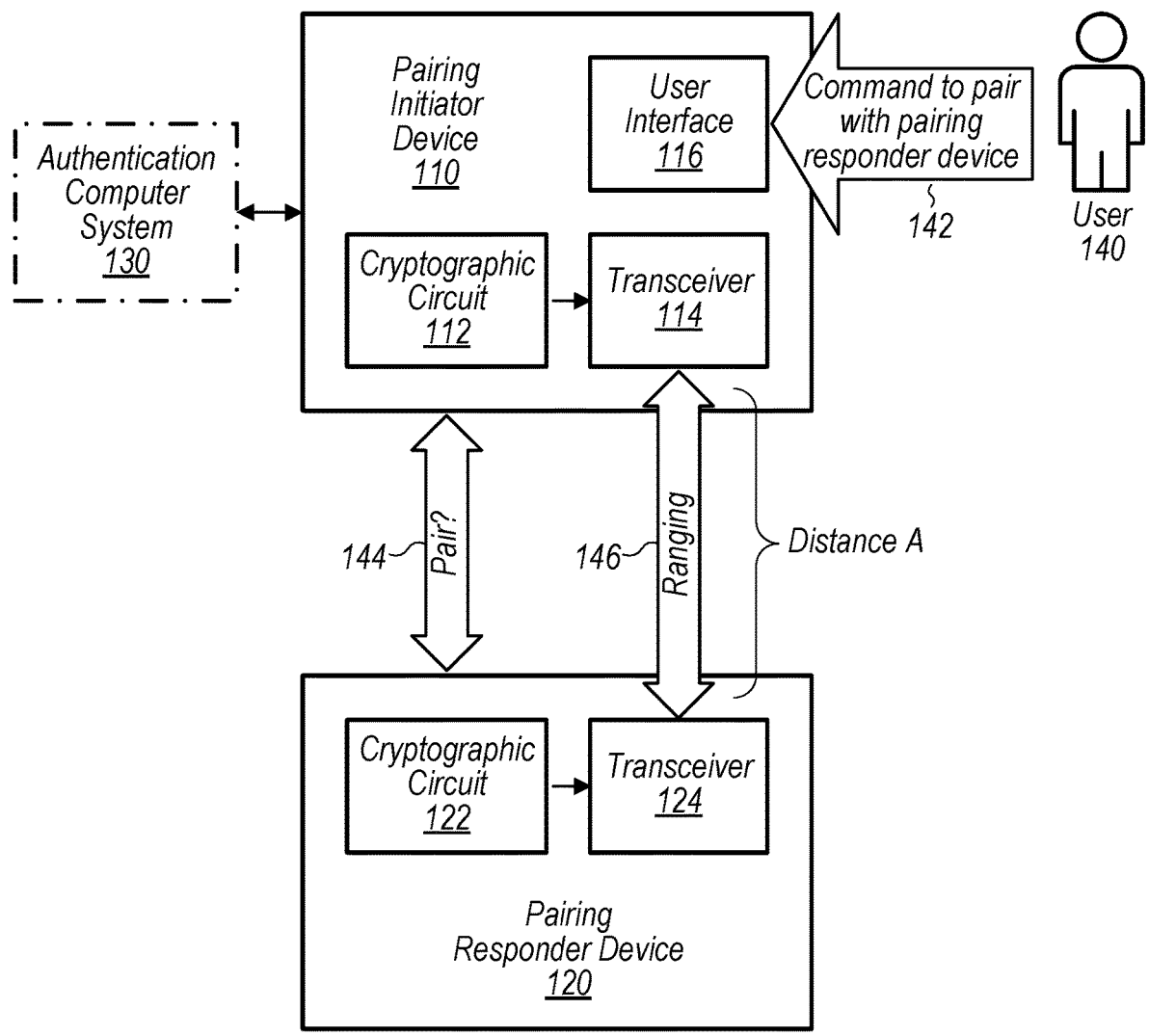
FIG. 1 is a block diagram illustrating communication between a pairing initiator device and a pairing responder device in accordance with various embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to receive a command" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" devices would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the word "module" refers to structure that stores or executes a set of operations. A module refers to hardware that implements the set of operations, or a memory storing the set of instructions such that, when executed by one or more processors of a computer system, cause the computer system to perform the set of operations. A module may thus include an application-specific integrated circuit implementing the instructions, a memory storing the instructions and one or more processors executing said instructions, or a combination of both.

DETAILED DESCRIPTION

Referring now to FIG. 1, a block diagram illustrating communication between a pairing initiator device 110 and a pairing responder device 120 is depicted. Pairing initiator device 110 receives a command 142 to pair with pairing responder device 120 from a user 140. Pairing initiator device 110 and pairing responder device 120 engage in various communications 144 relating to a pairing operation and various communications 146 relating to a ranging operation as discussed herein. In various embodiments, pairing initiator device 110 communicates with an authentication computer system 130 as part of the pairing operation. Commonly, the establishing of a communications connection between two different computer system is referred to as "pairing" such that when two devices are set up to communicate with one another, they are "paired." In various embodiments, after the pairing process is completed both of the paired devices will have the other's connection information. Such information may include, but is not limited to, one or more identifiers of the interlocutor device (e.g., a name, a MAC address, an IP address, etc.), one or more encryption keys used to secure communications between the paired devices, certificates associated with the interlocutor device, etc. In various embodiments, the pairing process includes negotiating one or more encryption keys used to secure communications between the paired devices.

Pairing initiator device 110 is one or more computer systems that communicates, pairs, and/or ranges with pairing responder device 120 as discussed herein. In various embodiments, pairing initiator device 110 communicates with authentication computer system 130 as discussed herein. In various embodiments, pairing initiator device 110 is remote from authentication computer system 130 and is disposed Distance A from pairing responder device 120. In various embodiments, pairing initiator device 110 and pairing responder device 120 communicate via a wireless (e.g., Bluetooth, Wi-Fi, Zigbee, Ultra-wideband) and/or wired communications medium. In various embodiments, pairing initiator device 110 is a mobile device including but not limited to a mobile phone, a tablet computer, a laptop computer, a wearable computer (e.g., smartwatch, smart glasses). In various embodiments, pairing initiator device 110 receives command 142 and in response attempts to pair and/or range with pairing responder device 120. The pairing initiator device 110 may also be referred to herein as the "first device," while the pairing responder device 120 may be referred to as the "second device." However, no ordering of these devices is implied. Moreover, while the pairing initiator device 110 is referred to herein as the "initiator," in various embodiments the "responder" may in fact send a message to pairing initiator device 110 first (e.g., via a broadcast ready-to-pair message). Pairing initiator device 110 is referred to herein as the "initiator" within the meaning of this disclosure because pairing initiator device 110 is the device that receives command 142 from the user. In various embodiments, pairing initiator device 110 includes one or more cryptographic circuits 112, one or more transceivers 114, and one or more user interfaces 116. Pairing initiator device 110 is discussed in further detail herein in reference to FIG. 2.

Pairing responder device 120 is one or more computer systems that communicates, pairs, and/or ranges with pairing initiator device 110 as discussed herein. In various embodiments, pairing responder device 120 communicates with authentication computer system 130 as discussed here. In various embodiments, pairing responder device 120 is remote from authentication computer system 130 and is disposed Distance A from pairing initiator device 110. In various embodiments, pairing initiator device 110 and pairing responder device 120 communicate via a wireless (e.g., Bluetooth, Wi-Fi, Zigbee, Ultra-wideband) and/or wired communications medium. In various embodiments, pairing responder device 120 is any of a number of devices that can pair with pairing initiator device 110 included but not limited to a mobile phone, a tablet computer, a laptop computer, a wearable computer (e.g., smartwatch, smart glasses), a smart home device (e.g., an APPLE HOME-POD®), a tracking and location device, wireless headphones, a wireless headset, a wireless speaker, a wireless game or media controller, etc. In various embodiments, pairing responder device 120 includes one or more cryptographic circuits 122 and one or more transceivers 124. Pairing responder device 120 is discussed in further detail herein in reference to FIG. 3.

In various embodiments, authentication computer system 130 is one or more computer systems with pairing initiator device 110 and/or pairing responder device 120. In such embodiments, authentication computer system 130 is remote from pairing initiator device 110 and/or pairing responder device 120. In various other embodiments, however, pairing initiator device 110 and pairing responder device 120 are able to pair and range as discussed herein without either communicating with authentication computer system 130. In various embodiments, authentication computer system 130 is configured to verify the authenticity of pairing initiator device 110 and/or pairing responder device 120. In some of such embodiments, authentication computer system 130 receives, verifies, signs, and/or sends cryptographic information such that the authentication computer system 130 is able to determine whether pairing initiator device 110 and/or pairing responder device 120 is authentic. For example, in various embodiments, authentication computer system 130 is configured to receive cryptographic information generated by pairing responder device 120 and sent to authentication computer system 130 by pairing initiator device 110 (e.g., the cryptographic indicator 406 discussed in connection to FIG. 4 herein), process the received cryptographic information, and determine the authenticity of pairing responder device 120. In various embodiments, authentication computer system 130 is an attestation server (or attestation computer system) that provides an attestation of the authenticity of pairing initiator device 110 to pairing responder device 120 or vice versa. In various embodiments, authentication computer system 130 includes a manufacturer's privacy certificate authority or a third-party privacy certificate authority. The actions performed by authentication computer system 130 are discussed in further detail herein in reference to FIG. 4.

In various embodiments, user 140 is a natural person who as access to pairing initiator device 110. As discussed herein in further detail with reference to FIGS. 2 and 4, user 140 inputs command 142 to pairing initiator device 110 which pairs and ranges with pairing initiator device 120. In various embodiments, after user 140 has input command 142, pairing initiator device 110 and pairing responder device 120 become wirelessly paired without further input from the user. In some instances, user 140 is prompted to bring pairing initiator device 110 within a threshold distance of pairing responder device 120 (e.g., distance prompt 424 discussed in connection with FIG. 4). In some embodiments, user 140 receives a user notification 430 indicating the result of the pairing operation (e.g., success, failure, error).

In various embodiments, pairing initiator device 110 and pairing responder device 120 exchange communications 144 relating to a pairing operation and various communications 146 relating to a ranging operation as discussed herein. These communications are discussed in further detail in reference to FIG. 4. In various embodiments, after receiving command 142, pairing initiator device 110 and pairing responder device 120 exchange various communications 144 to negotiate one or more cryptographic keys to secure communications 144 and exchange connection information with one another to facilitate the pairing process. In various embodiments, pairing initiator device 110 and pairing responder device 120 exchange various communications 146 (e.g., using transceivers 112 and 122) to range with each other and determine a Distance A between pairing responder device 120 and pairing initiator device 110. As discussed herein, based on Distance A being below a threshold distance, wirelessly pairing the pairing responder device 120 with the pairing initiator device 110 without further input from user 140. As used herein, this "input" from user 140 refers to any input to pairing initiator device 110 or pairing responder device 120 that is received via a user interface of either of those devices. In various embodiments, user 140 may be prompted to bring pairing initiator device 110 within the threshold distance from pairing responder device 120, but in such embodiments user 140 does not need to actually input information into pairing initiator device 110 (e.g., by pressing a button, by tapping a touchscreen) to complete the pairing operation discussed herein. Accordingly, as described and claimed herein, a user who physically moves a pairing initiator device 110 or pairing responder device 120 closer to the other to bring them within a threshold distance to complete the pairing operation (e.g., in response to a distance prompt 424 discussed in connection to FIG. 4) has not provided any "input" to the moved device 110 or 120 in order to complete the pairing operation after inputting command 142.

Accordingly, in various embodiments, user 140 is able to effectuate pairing between pairing initiator device 110 and pairing responder device 120 with a single input to only one of the devices 110 or 120 (i.e., command 142 to pairing initiator device 110). Because the confirmation of the intent to pair is inferred because the distance between the two devices 110 and 120 is below a threshold in various embodiments, the disclosed techniques allow user 140 to securely pair devices 110 and 120 with minimal interaction with one device and potentially no interaction with the other. As discussed herein in further detail in connection to FIG. 4, the threshold distance can be any appropriate distance, but in various embodiments is between 10 cm and 50 cm (e.g., 15 cm plus or minus 5 cm). In such embodiments, a confirmation of intent to pair can be inferred by the devices 110 and 120 being close together, which eliminates the need to, for example, additionally input a passcode on either device 110 or 120. In instances where pairing responder device 120 has limited input capabilities (e.g., not having a display, not having buttons), user 140 is thus able to pair the device 110 and 120 without a potentially cumbersome interaction with a pairing responder device 120 with limited input capabilities. Additionally, in some embodiments, the techniques disclosed herein may be used to further secure pairing between devices 110, 120 that receive user input to confirm the intent to pair devices 110 and 120. In such embodiments, determining the distance between devices 110 and 120 as discussed herein provides additional confirmation of intent to pair and/or to further protect from accidental or malicious pairing requests. Moreover, by leveraging the cryptographic circuits 112 and 122 to secure communications 144 and 146 (and in various embodiments communicating with authentication computer system 130), further security may be provided in various embodiments. Accordingly, a malicious device attempting to pair with pairing initiator device 110 would have to (a) be physically near pairing initiator device 110 and (b) be able to generate cryptographic information that appears authentic to pairing initiator device 110 and/or authentication computer system 130.

Figure 2:
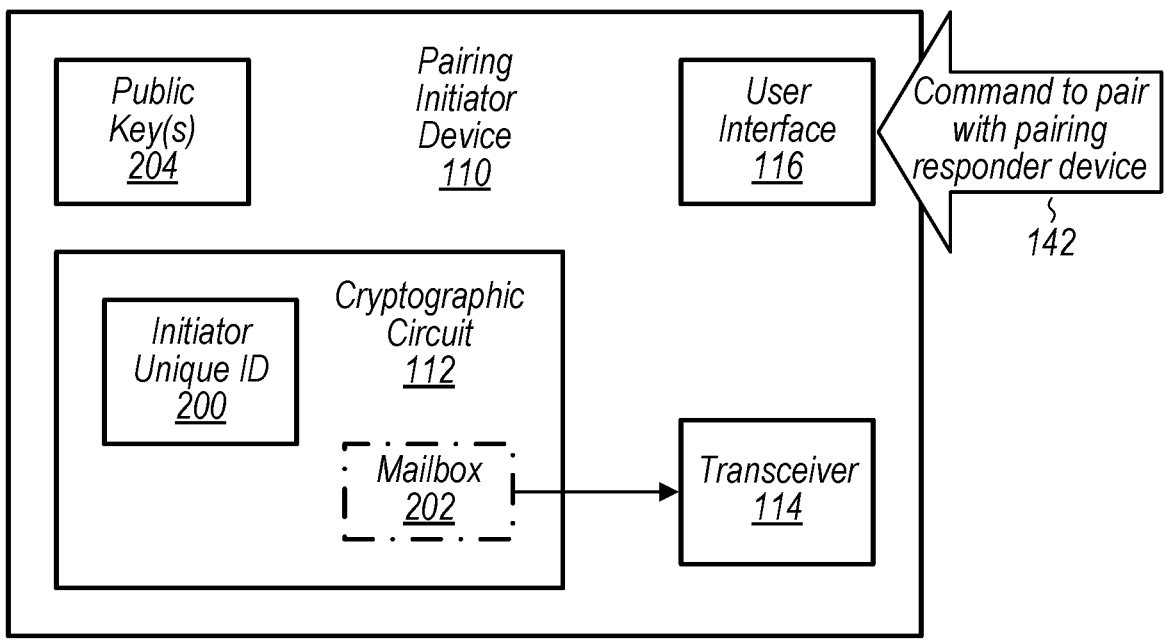
FIG. 2 is an expanded block diagram of the pairing initiator device of FIG. 1 in accordance with various embodiments.
Figure 3:
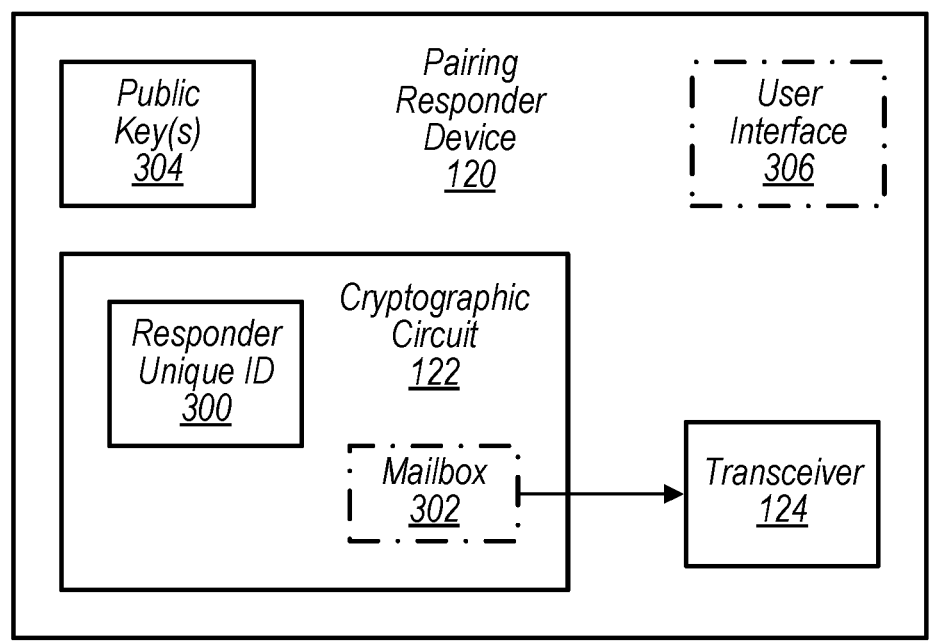
FIG. 3 is an expanded block diagram of the pairing responder device of FIG. 1 in accordance with various embodiments.

FIGS. 2 and 3 depict expanded block diagrams of pairing initiator device 110 and pairing responder device 120, respectively. Referring now to FIG. 2, an expanded block diagram of pairing initiator device 110 is depicted. In various embodiments, pairing initiator device 110 includes cryptographic circuit 112, transceiver 114, user interface 116, and one or more public keys 204. Referring now to FIG. 3, an expanded block diagram of pairing responder device 120 is depicted. As shown in FIG. 3, pairing responder device 120 includes cryptographic circuit 122, transceiver 124, one or more public keys 304, and user interface 306. In various embodiments, various components of pairing initiator device 110 and pairing responder device 120 shown in FIGS. 2 and 3 are optional. For example, in various embodiments, mailboxes 202 and 302 and/or user interface 306 are omitted.

In various embodiments, cryptographic circuits 112 and 122 are computing devices that comprise a key generation module that can generate cryptographic information useable to secure the pairing and ranging processes disclosed herein. Each cryptographic circuit 112 and 122 has a respective, unique identifier: an initiator unique identifier 200 and a responder unique identifier 300. In various embodiments, either or both cryptographic circuit 112 or 122 includes a mailbox (i.e., a mailbox 202 and a mailbox 302, respectively). In some embodiments, cryptographic circuits 112 and 122 are implemented using the same (or similar) hardware, software, and firmware and only materially differ by having different unique identifiers 200, 300. In other embodiments, however, the cryptographic circuits 112 and 122 differ by, for example, (a) one being optimized for low power consumption for use in a battery-powered device with the other being optimized for use in a device drawing power from a power grid, (b) one being designed with stricter security parameters than the other, and/or (c) one having greater amounts of memory or processing speed than the other. In various embodiments, cryptographic circuits 112 or 122 are secure enclave processors (SEP). In various embodiments, cryptographic circuits 112 or 122 include one or more components that are walled off from access by other components of the device 110 or 120 in which the cryptographic circuits 112 or 122 are installed (e.g., through the use of a mailbox 202 or 302 discussed herein).

In various embodiments, cryptographic circuits 112 and 122 are configured to generate one of more hardware reference keys (HRK) for use by the pairing initiator device 110 or pairing responder device 120, respectively. In some embodiments, cryptographic circuits 112 and 122 are configured to generate one or more hardware reference key attestations (HKRA) that attest to the authenticity of the hardware reference keys generated, and are useable (e.g., by authentication computer system 130) to verify the authenticity of the pairing initiator device 110 or pairing responder device 120 as discussed herein. In various embodiments, the HRK can be an asymmetric key pair, having a private key and a public key portion. The HRKA can identify information about the cryptographic circuits 112 and 122 (and/or pairing initiator device 110 or pairing responder device 120) such as the operating system version running on the cryptographic circuits 112 and 122, the make and model of the pairing initiator device 110 or pairing responder device 120, the serial number of the pairing initiator device 110 or pairing responder device 120, etc. In various embodiments, the cryptographic circuits 112 and 122 comprise secure portions of a system on a chip.

In various embodiments, the HRKA is cryptographic indicator (e.g., a cryptographic indicator 406 discussed in connected to FIG. 4). The HRKA can attest to the processing system classification (e.g. a processor type such as the Apple® A9) that was running on the cryptographic circuits 112 or 122 at the time that the HRK was generated. The HRKA can further attest to the version of an operating system (e.g., secure enclave processor operating system, SEP OS) that was running on the cryptographic circuits 112 or 122 at the time that the HRK was generated. The HRKA can be sent to authentication computer system 130 as discussed herein. In such embodiments, authentication computer system 130 stores sufficient information to verify that an HRKA attesting to an HRK was in fact generated by the pairing initiator device 110 or pairing responder device 120 that generated the HRK. As discussed herein, authentication computer system 130 can then generate a certificate (e.g., the authentication indicator 408 discussed in connection to FIG. 4) and return the certificate to the pairing initiator device 110 or pairing responder device 120 for use in the pairing and/or ranging processes discussed herein.

In various embodiments, cryptographic circuits 112 and 122 include respective unique identifiers 200, 300. In various embodiments each of unique identifiers 200, 300 uniquely identifies the cryptographic circuits 112 or 122 within pairing initiator device 110 or pairing responder device 120. As discussed herein, authentication computer system 130 stores copies of the unique identifiers 200, 300 or indicators derived from the unique identifiers 200, 300 (e.g., cryptographic keys or certificates generated using the unique identifiers 200, 300). Such information may be, for example, obtained during the manufacturing process of cryptographic circuits 112 and 122. In various embodiments, unique identifiers 200, 300 are used by their respective cryptographic circuits 112, 122 to generate one or more cryptographic indicators (e.g., a HRK, a HKRA) and/or shared ranging keys. In various embodiments, the cryptographic circuits 112, 122 store their respective unique identifiers 200, 300 in secure memory (e.g., one or more registers) within cryptographic circuits 112, 122 that is walled off from access by other components of the device 110 or 120. In various embodiments, the content of such secure memory is set during the manufacture of cryptographic circuits 112, 122. In some embodiments, the unique identifiers 200, 300 are permanently set (e.g., by burning a sequence of fuses) during manufacture. In other embodiments, unique identifiers 200, 300 become set as a result of random variation in the manufacturing process.

As discussed herein, pairing initiator device 110 and pairing responder device 120 are configured to generate a shared ranging key based on cryptographic identities (e.g., unique identifiers 200, 300) of the pairing initiator device and the pairing responder device in various embodiments. This shared ranging key is used by the transceiver 114, 124 to secure ranging communications (e.g., by encrypting such communications, by generating unpredictable wireless transmissions). In various embodiments, unique identifiers 200, 300 are used to facilitate a cryptographic key exchange protocol to agree on a symmetric shared ranging key (e.g., a SIGMA protocol, a Diffie-Hellman key exchange). As discussed herein in reference to FIG. 4 during key negotiation 404, pairing initiator device 110 and pairing responder device 120 are configured to generate private-public key pairs in which the public key is shared with the interlocutor such that each has its own private key and the public key of the other (e.g., one of the public keys 204, 304). Using its own private key and the other's public key, both the pairing initiator device 110 and pairing responder device 120 are thus able to mutually derive the same shared ranging key. Similarly, unique identifiers 200, 300 are used to facilitate a cryptographic key exchange protocol to agree on a symmetric shared communications key to encrypt communications during the pairing operation and after pairing is complete. In various embodiments, the shared ranging key and the shared communications key are different but are separately derived from the same key.

In various embodiments, the cryptographic circuits 112 and 122 include respective mailboxes 202, 302. In such embodiments, the internal components of cryptographic circuits 112, 122 are not accessible from outside the cryptographic circuits 112, 122. In such embodiments, the internal components of the cryptographic circuits 112, 122 are hardware-isolated from other computing components of the device 110 or 120 by the mailbox 202, 302. In such embodiments, information may be sent from cryptographic circuit 112, 122 to the rest of device 110, 120 via mailbox 202, 302, respectively. Similarly, information may be passed from device 110, 120 to its cryptographic circuit 112, 122 via mailbox 202, 302, respectively. Mailboxes 202, 302 are optional components in various embodiments such that neither, either, or both of pairing initiator device 110 and pairing responder device 120 may include a mailbox 202, 302 in various embodiments.

In various embodiments, public keys 204, 304 are any of a number of public keys stored by respective pairing initiator device 110 and pairing responder device 120. As discussed herein, pairing initiator device 110 stores a public key 204 corresponding to pairing responder device 120 in various embodiments. Similarly, pairing responder device 120 stores a public key 304 corresponding to pairing initiator device 110 in various embodiments. Moreover, in various embodiments, either or both of pairing initiator device 110 and pairing responder device 120 store a public key 204, 304 corresponding to authentication computer system 130. Such public keys 204, 304 corresponding to authentication computer system 130 are useable to verify authentication indicators from authentication computer system 130 (e.g., authentication indicator 408 referred to in FIG. 4) as discussed herein.

Transceiver 114, 124 can be any of a number of wired and/or wireless transmitters and receivers usable to range as discussed herein. In various embodiments, transceiver 114, 124 is a Bluetooth® transceiver. In various embodiments, pairing initiator device 110 and/or pairing responder device 120 include one or more other wired and/or wireless communications modules (not shown). For example, pairing initiator device 110 and/or pairing responder device 120 may include a cellular communications module, an IEEE 802.11 wireless communications module, a GPS receiver, a near-field communications module, or any combination thereof. In such embodiments, the pairing initiator device 110 and/or pairing responder device 120 can use these communications modules to communicate with other devices (e.g., authentication computer system 130) over various networks (e.g., the Internet). As discussed herein, in some embodiments, pairing responder device 120, however, has no capability to access the Internet directly and uses pairing initiator device 110 as an intermediary. In other embodiments, however, pairing responder device 120 has its own networking capability and can access other devices (e.g., authentication computer system 130) independent of pairing initiator device 110. In some of such embodiments, though, pairing responder device 120 is not configured to communicate with authentication computer system 130 prior to the pairing operation. This can be, for example, because the communications capability of pairing responder device 120 requires information to access the Internet (e.g., pairing responder device 120 does not have the SSID and passkey for access to a local wireless network). In such embodiments, pairing responder device 120 can receive configuration commands and/or instructions from pairing initiator device 110 after pairing as discussed herein with reference to FIG. 4.

In various embodiments, pairing initiator device 110 and/or pairing responder device 120 include respective user interfaces 116, 306. In various embodiments, user interfaces 116, 306 are any of a number of devices configured to present information to user 140 and/or receive information from user 140 (e.g., command 142). Such devices include but are not limited to any number of displays or light arrays, graphical user interfaces presented via touchscreen, keyboards, buttons, microphones, speakers, haptic interfaces, motion sensors, cameras, etc. It will be understood that the format of command 142 will depend on the type of user interface 116 used to receive command 142. For example, in embodiments where user interface 116 is a touchscreen, command 142 comprises one or more touches on buttons or icons on a graphical user interface presented on the touchscreen. In other embodiments, command 142 may be an audible command received by a microphone, a gesture received by a camera, a shake received via one or more accelerometers, etc.

In various embodiments, pairing responder device 120 does not include a user interface 306 and is therefore incapable of directly receiving information from user 140 and/or presenting information to user 140. In other embodiments, pairing responder device 120 includes a user interface 306, but such user interface 306 is configured only to present limited information and to receive only limited information from user 140. As a non-limiting example, in embodiments where pairing responder device 120 is a location tracking device, user interface 306 consists of a button to activate the location tracking features of the device (e.g., sending a signal to locate a misplaced pairing initiator device 110 after pairing) and a light to indicate to user 140 that the location tracking feature has been activated. But, in such an embodiment, however, user interface 306 is not configured to receive, for example, a command from user 140 confirming an intent to pair with pairing initiator device 110.

In various embodiments, pairing responder device 120 broadcasts a "pairing available" message (e.g., using transceiver 124) in anticipation that a pairing initiator device 110 might attempt to pair with pairing responder device 110. In such embodiments, pairing initiator device 110 is configured to detect pairing responder device 120, and based on the detecting, prompt user 140 with a message asking whether to input command 142 to wirelessly pair with pairing responder device 120. As discussed herein, upon receiving command 142 to wirelessly pair with the pairing responder device, pairing initiator device 110 sends, to the pairing responder device, a request to wirelessly pair with pairing responder device 120.

Figure 4A:
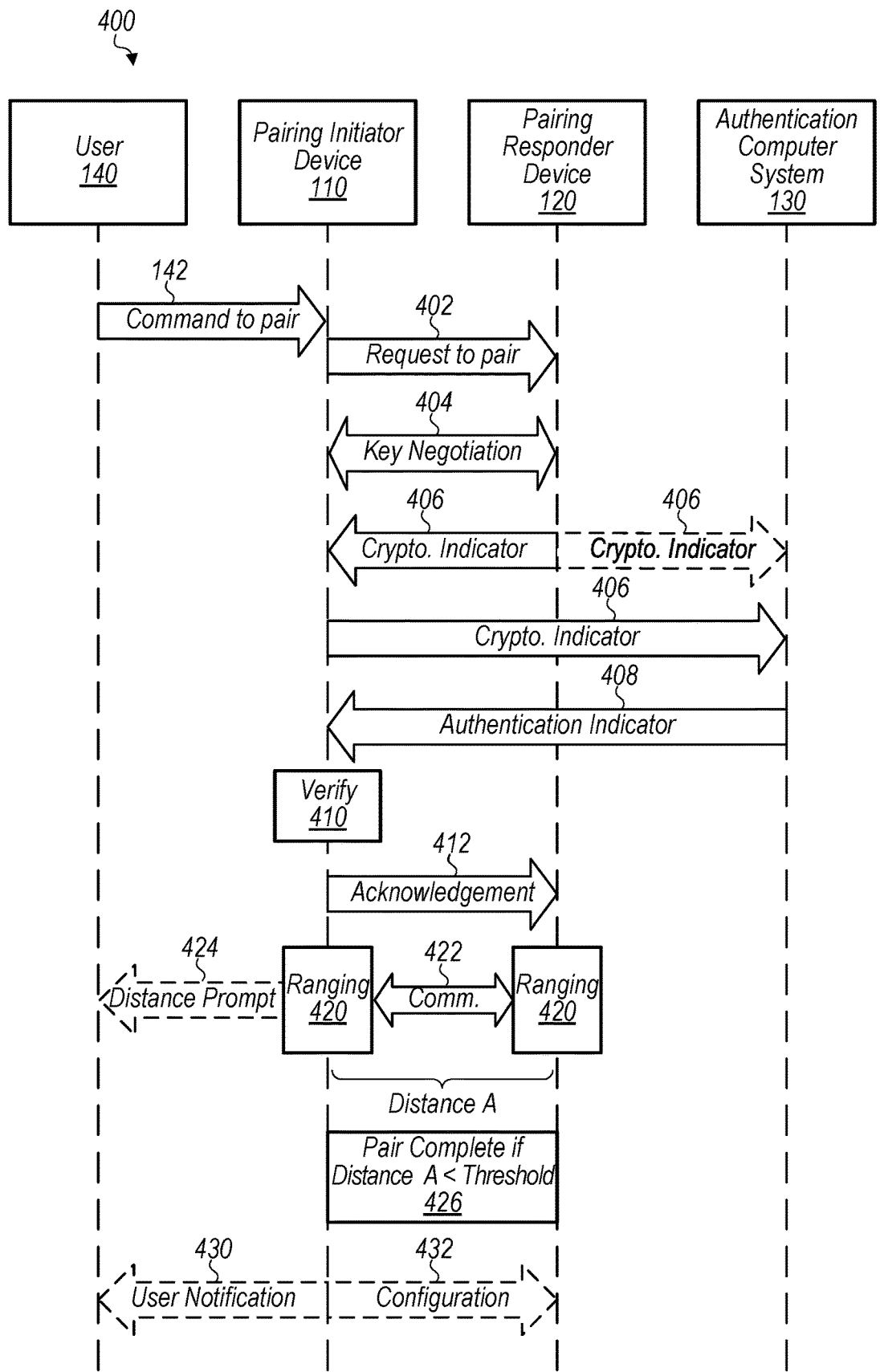
FIG. 4A is a flowchart illustrating an embodiment of a pairing and ranging method in accordance with the disclosed embodiments.

FIGS. 4A, 4B, 5, and 6 illustrate various flowcharts representing various disclosed methods implemented with the components depicted in FIG. 1. Referring now to FIG. 4A, a flowchart illustrating an embodiment of a pairing and ranging method 400 is shown. In the embodiment shown in FIG. 4A, the various actions associated with method 400 are implemented by pairing initiator device 110, pairing responder device 120, and authentication computer system 130 while receiving input from (and in some embodiments providing output to) user 140.

In various embodiments, method 400 is initiated by user 140 entering command 142 to pairing initiator device 110 (e.g., by tapping a touchscreen of user interface 116). In response to command 142, pairing initiator device 110 sends a request to pair 402 to pairing responder device 120.

During key negotiation 404, pairing initiator device 110 and pairing responder device 120 negotiate a shared communications key and/or shared ranging key (e.g., using cryptographic circuits 112 and 122 as discussed herein). In some embodiments, both pairing initiator device 110 and pairing responder device 120 mutually generate a shared key using a cryptographic protocol, but in other embodiments negotiation includes determining which of a set of predetermined keys to use or simply sending the key from one device to the other.

Subsequent to key negotiation 404, pairing responder device 120 sends cryptographic indicator 406 to pairing initiator device 110 for retransmission to authentication computer system 130 in various embodiments (e.g., embodiments in which pairing responder device 120 lacks capability to directly communicate with authentication computer system 130 due to a lack of hardware or lack of configuration). In turn, pairing initiator device 110 receives cryptographic indicator 406 and sends it along to authentication computer system 130. In other embodiments, pairing initiator device 110 is configured to authenticate cryptographic indicator 406 itself (i.e., without sending it to authentication computer system 130). In still other embodiments, pairing responder device 120 is configured to send cryptographic indicator 406 to authentication computer system 130 directly. As discussed herein, cryptographic indicator 406 is generated by pairing responder device 120 (e.g., using cryptographic circuit 122) and is useable by an attestation server (e.g., authentication computer system 130) to authenticate pairing responder device 120. In various embodiments, cryptographic indicator 406 is a HRKA or other attestation of the authenticity of pairing responder device discussed with reference to FIGS. 2 and 3 herein.

After receiving cryptographic indicator 406, authentication computer system 130 determines the authenticity of pairing responder device 120 according to one or more cryptographic techniques. For example, authentication computer system 130 can receive cryptographic indicator 406 and determine that it (or one or more values derived from it) match a stored value (e.g., the unique identifier 300 stored during the manufacture of pairing responder device 120, a value that was calculated from unique identifier 300, etc.) in various embodiments. Upon determining the authenticity of pairing responder device 120, authentication computer system 130 sends an authentication indicator 408 of the authenticity of the pairing responder device 120 to pairing initiator device 110. In various embodiments, authentication indicator 408 is an attestation indicator that proves that the authentication computer system 130 determined that cryptographic indicator 406 is a valid attestation of the authenticity of pairing responder device 120. In various other embodiments, no authentication computer system 130 is present and pairing initiator device 110 authenticates pairing responder device 120 itself. In some of such embodiments, both pairing initiator device 110 and pairing responder device 120 have copies of a symmetric key (e.g., a symmetric key shared with both devices 110, 120 when they were manufactured). In various embodiments, the symmetric key is used to facilitate a cryptographic key exchange or cryptographic key derivation to agree on a symmetric shared ranging key between pairing initiator device 110 and pairing responder device 120.

Based on pairing initiator device 110 receiving (and in embodiments verifying) authentication indictor 408 (or in some embodiments authenticating pairing responder device 120 directly), pairing initiator device 110 continues with the ranging and pairing operations continue as discussed further herein. In other embodiments, pairing initiator device 110 receives an authentication failure indicator from authentication computer system 130 (or does not receive any response at all). In such embodiments, pairing initiator device 110 aborts the pairing operation (and does not begin the ranging operation) based on either receiving an authentication failure indicator or by an amount of time expiring without receiving a response from authentication computer system 130.

In various embodiments, pairing initiator device 110 verifies the received authentication indicator 408 at block 410. In such embodiments, pairing initiator device 110 may verify the authentication indicator 408 using any of a number of cryptographic techniques. For example, in some embodiments, authentication indicator 408 is a certificate that is verified using one or more values included with authentication indicator 408. In such embodiments, completing the pairing operation is conditioned on successfully verifying authentication indicator 408 (e.g., the pairing process is aborted if authentication indicator 408 is not successfully verified).

Upon receiving (and in various embodiments verifying) authentication indicator 408, pairing initiator device 110 sends an acknowledgement 412 of authentication (or in embodiments, attestation) based on authentication indicator 408 received from authentication computer system 130. In various embodiments, acknowledgement 412 provides notice to pairing responder device 120 to begin ranging (either immediately, or after the expiration of a timer). In other embodiments, acknowledgement 412 includes additional information to be used in the ranging operation (e.g., a channel on which to range, an additional key to secure ranging, an indication of the threshold maximum distance to finish pairing).

At blocks 420, pairing initiator device 110 and pairing responder device 120 exchange various ranging communications 422 to determine the distance (i.e., Distance A) between pairing initiator device 110 and pairing responder device 120. In various embodiments, communications 422 are secured (e.g., encrypted, signed and encrypted) using a shared ranging key (and in embodiments a certificate from the device 110, or 120 sending a particular communication 422). In various embodiments, the ranging operation includes device 110 and 120 synchronizing one or more clocks. In such embodiments, a device 110 or 120 sends a first communication 422 to the other noting the time the first communication 422 is sent, and the interlocutor responds with a second communication 422 indicating the time the first communication was received. The difference between the two times can therefore be used to estimate the distance (over a wire for wired communication or through space for wireless communication) between the devices 110 and 120. In other embodiments, other ranging techniques may be used to estimate the distance between devices 110 and 120.

In various embodiments, the ranging operation includes sending a distance prompt 424 to user 140 to bring pairing initiator device 110 within the threshold distance from pairing responder device 120. In various embodiments, the ranging operation occurs on a regular basis for a period of time such that the devices 110 and 120 regularly (or continuously) range with one another such that the ranging operation continues without input from user 140.

At block 426, pairing initiator device 110 and pairing responder device 120 complete the pairing operation based the Distance A being below a threshold distance. In various embodiments, the threshold distance is between 10 cm and 50 cm (although other distances can be used). In some of such embodiments, for example, the distance is 15 cm plus or minus 5 cm. In various embodiments, the threshold distance is a relatively close distance to avoid mistaken or fraudulent pairing. When mistaken or fraudulent pairing is less of a concern, however (e.g., in a physically secure area like a private corporate or government facility), the threshold distance can be relatively large and limited only by the maximum transmission range of transceivers 114, 124. In other instances, however, if Distance A is not under the threshold distance after a period of time (e.g., 2 minutes, but any time could be used) the pairing process times out and is cancelled in various embodiments.

After pairing initiator device 110 and pairing responder device 120 have successfully paired, user 140 may be sent a user notification 430 (e.g., presented on user interface 116) in various embodiments. In some embodiments, subsequent to wirelessly pairing, pairing initiator device 110 sends on or more configuration messages 432 to pairing responder device 120. Such configuration messages 432 can include, for example, instructions to configure pairing responder device 120 (i.e., optional information that pairing responder device 120 may use to configure itself depending on settings on pairing responder device 120) or commands to configure pairing responder device 120 (i.e., mandatory information that pairing responder device 120 uses to configure itself). After receiving such configuration messages 432, pairing responder device 120 changes one or more of its settings based on such configuration messages 432. In a first example, pairing responder device 120 is not configured to directly communicate (i.e., not using pairing initiator device 110 as an intermediary) with authentication computer system 130 (or with the Internet more broadly) prior to the pairing operation. Configuration messages 432, however, provide configuration settings necessary to communicate with authentication computer system 130 and/or the Internet (e.g., a wireless network name and passkey, cellular communications settings).

Figure 4B:
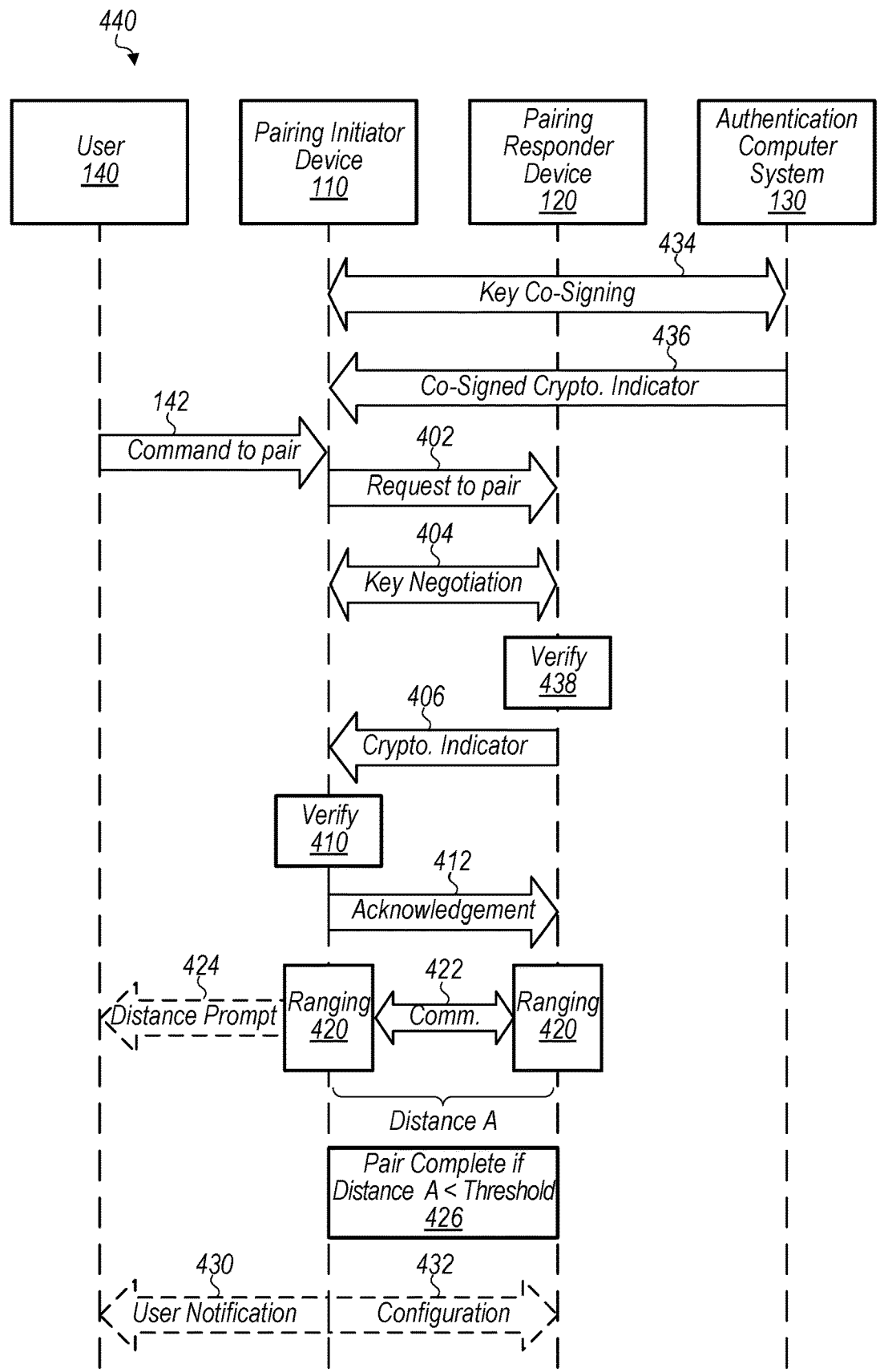
FIG. 4B is a flowchart illustrating an alternate embodiment of a pairing and ranging method in accordance with the disclosed embodiments.

Referring now to FIG. 4B, a flowchart illustrating an alternate embodiment of a pairing and ranging method 440 is shown. In the embodiment shown in FIG. 4B, the various actions associated with method 440 are implemented by pairing initiator device 110, pairing responder device 120, and authentication computer system 130 while receiving input from (and in some embodiments providing output to) user 140.

In various embodiments, the pairing process discussed herein is initiated and completed without either pairing initiator device 110 or pairing responder device 120 communicating with authentication computer system 130. In some of such embodiments, neither of pairing initiator device 110 or pairing responder device 120 communicate with any other computer system during the pairing process (e.g., neither pairing initiator device 110 or pairing responder device 120 have access to the Internet). In such embodiments, pairing initiator device 110 and authentication computer system 130 engage in key co-signing 434 prior to the pairing process being initiated. For example, in various embodiments, key co-signing 434 is performed a few hours before the pairing process is performed. In key co-signing 434, pairing initiator device 110 sends a cryptographic indicator (e.g., a token signed with a private key of pairing initiator device 110) to authentication computer system 130, authentication computer system 130 authenticates the cryptographic indicator (e.g., using a public key associated with pairing initiator device 110), and then authentication computer system 130 co-signs the cryptographic indicator using a private key associated with authentication computer system 130. The co-signed cryptographic indicator 436 is then sent to pairing initiator device 110 for use in the pairing process. In some of such embodiments, pairing initiator device 110 sends the co-signed cryptographic indicator 436 to pairing responder device 120 during key negotiation 404. Pairing responder device 120 then verifies the co-signed cryptographic indicator 436 using a public key associated with authentication computer system 130 at block 438. Then, pairing responder device 120 sends its cryptographic indicator 406 to pairing initiator device 110. Pairing initiator device 110 then verifies the pairing cryptographic indicator 406 at block 410. The method 440 then proceeds in the same manner as method 400 discussed in reference to FIG. 4A.

Referring again to FIGS. 4A and 4B, as discussed herein, methods 400 and 440 allow user 140 to securely effectuate pairing between two devices with minimal input from user 140 (i.e., only command 142 to pairing initiator device 110). In various embodiments, user 140 provides no input at all to pairing responder device 120. Indeed, in various embodiments, pairing responder device 120 lacks a user interface 306 is therefore incapable of receiving input from user 140, but can be paired with pairing initiator device 110 as discussed herein. As discussed above, user 140 who moves pairing initiator device 110 closer to pairing responder device (or vice versa) has not provided additional input as defined herein, and the only input from user 140 necessary to start and complete the method 400 is command 142. Accordingly, the techniques disclosed herein provide both quality of life improvement to the user experience (i.e., pairing requires minimal user effort and "just works") without sacrificing security (e.g., because pairing only is completed when devices 110 and 120 are close together, communications between devices 110 and 120 are secured using cryptographic techniques, and authentication computer system 130 can verify the authenticity of pairing responder device 120 using previously stored information).

Figure 5:
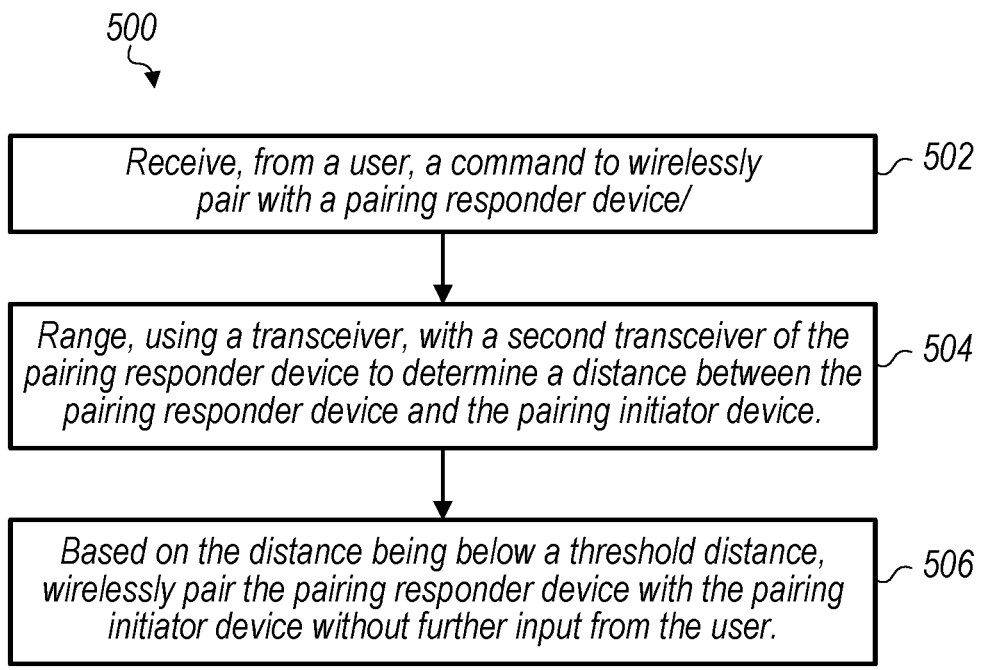
FIG. 5 is a flowchart illustrating an embodiment of a pairing and ranging method in accordance with the disclosed embodiments.

Referring now to FIG. 5 a flowchart illustrating an embodiment of a pairing and ranging method 500 is shown. In various embodiments, the various actions associated with method 500 are performed by pairing initiator device 110. At block 502, pairing initiator device 110 receives, from user 140, a command 142 to wirelessly pair with a pairing responder device 120. At block 504, pairing initiator device 110 ranges. using transceiver 114, with transceiver 124 of pairing responder device 120 to determine a distance between pairing responder device 110 and pairing initiator device 120. At block 506, based on the distance being below a threshold distance, pairing initiator device 110 wirelessly pairs with pairing initiator device 120 without further input from user 140.

Figure 6:
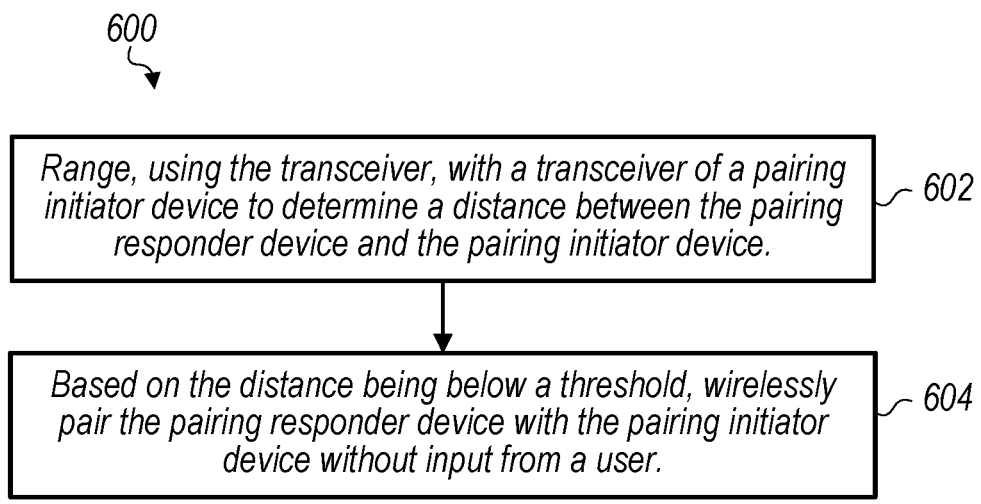
FIG. 6 is a flowchart illustrating an embodiment of a pairing and ranging method in accordance with the disclosed embodiments.

Referring now to FIG. 6 a flowchart illustrating an embodiment of a pairing and ranging method 600 is shown. In various embodiments, the various actions associated with method 600 are performed by pairing responder device 120. At block 602, pairing responder device 120 ranges, using transceiver 124, with transceiver 114 of pairing initiator device 110 to determine a distance between pairing responder device 120 and the pairing initiator device 110. At block 604, based on the distance being below a threshold, pairing responder device wirelessly pairs with the pairing initiator device without input from user 140 to pairing responder device 120.

Exemplary Computer System

Figure 7:
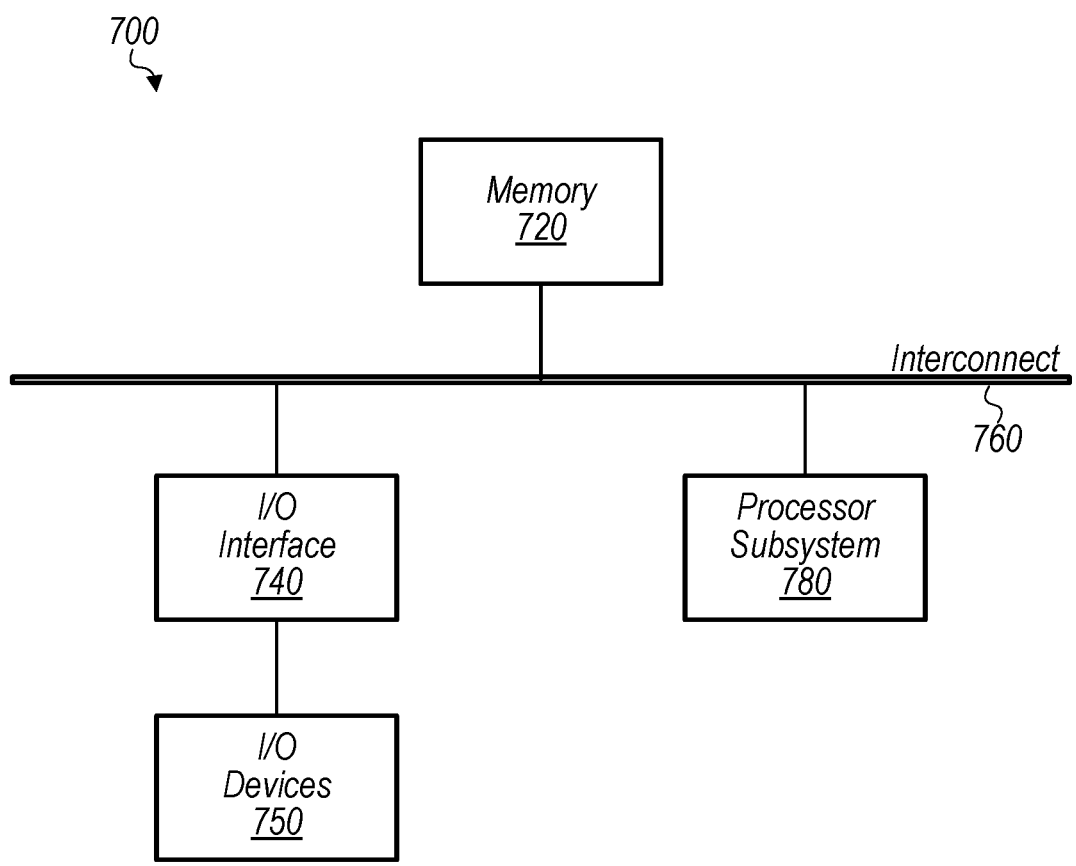
FIG. 7 is a block diagram of an exemplary computer system, which may implement the various components of FIGS. 1, 2, and 3.

Turning now to FIG. 7, a block diagram of an exemplary computer system 700—which may implement the various components shown in FIGS. 1, 2, and 3 (e.g., pairing initiator device 110, pairing responder device 120)—is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable to store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over Wi-Fi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various embodiments described herein may gather and/or use data available from specific and legitimate sources to improve the delivery to users of invitational content or any other content that may be of interest to them (e.g., content delivered using pairing initiator device 110 and/or pairing responder device 120). The present disclosure contemplates that, in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

What is claimed is:

1. A pairing initiator device comprising:
   a computer processor system;
   a transceiver; and
   a computer memory storing instructions executable by the computer processor system to cause the pairing initiator device to perform operations comprising:
   receiving, from a user, a command to wirelessly pair with a pairing responder device;
   receiving, from the pairing responder device, a first cryptographic indicator generated by the pairing responder device, wherein the first cryptographic indicator is useable by an attestation server to authenticate the pairing responder device;
   sending, from the pairing initiator device to the attestation server, the first cryptographic indicator;
   receiving, from the attestation server, an authentication indicator of the authenticity of the pairing responder device; and
   based on receiving the authentication indicator:
      ranging, using the transceiver, with a transceiver of the pairing responder device to determine a distance between the pairing responder device and the pairing initiator device; and
      based on the distance being below a threshold distance, wirelessly pairing the pairing responder device with the pairing initiator device without further input from the user.

2. The pairing initiator device of claim 1, wherein the operations further comprise:
   prior to the wirelessly pairing the pairing responder device with the pairing initiator device:
      detecting the pairing responder device;
      based on the detecting, prompting the user whether to input the command to wirelessly pair with the pairing responder device; and
      based on receiving the command to wirelessly pair with the pairing responder device, sending, to the pairing responder device, a request to wirelessly pair with the pairing responder device.

3. The pairing initiator device of claim 1, the operations further comprising:
   verifying the authentication indicator;
   wherein the ranging and wirelessly pairing are performed based on verifying the authentication indicator.

4. The pairing initiator device of claim 1, further comprising:
   a cryptographic circuit;
   wherein the operations further comprise:
      generating, with the cryptographic circuit, a shared ranging key based on cryptographic identities of the pairing initiator device and the pairing responder device;
      wherein the ranging is performed using the shared ranging key.

5. The pairing initiator device of claim 1, the operations further comprising:
   prompting the user to bring the pairing initiator device within the threshold distance from the pairing responder device.

6. The pairing initiator device of claim 1, wherein the operations further comprise:
   aborting the wirelessly pairing in response to receiving, at the pairing initiator device from the attestation server, an authentication failure indicator.

7. The pairing initiator device of claim 1, wherein the operations further comprise:
   subsequent to wirelessly pairing the pairing responder device with the pairing initiator device, sending, to the pairing responder device, instructions to configure the pairing responder device.

8. A method comprising:
   receiving, at a pairing initiator device, a pairing operation start command from a user to wirelessly pair with a pairing responder device; and
   based on receiving the pairing operation start command, performing a pairing operation to wirelessly pair with the pairing responder device, wherein the pairing operation includes:
      sending, from the pairing initiator device to the pairing responder device, a request to pair the pairing initiator device with the pairing responder device;
      receiving, from the pairing responder device at the pairing initiator device, a first cryptographic indicator generated by the pairing responder device that is useable, by an attestation server, to authenticate the pairing responder device;
      sending, from the pairing initiator device, the first cryptographic indicator to the attestation server;
      receiving, at the pairing initiator device from the attestation server, an authentication indicator of the authenticity of the pairing responder device; and
      completing the pairing operation based on receiving the authentication indicator;
   wherein the pairing operation start command is the only user input associated with the pairing operation.

9. The method of claim 8, wherein the pairing operation further includes:
   verifying, with the pairing initiator device, the authentication indicator; and
   wherein completing the pairing operation is also based on successfully verifying the authentication indicator.

10. The method of claim 8, wherein the pairing operation includes:
    determining a distance between the pairing initiator device and the pairing responder device; and
    completing the pairing operation based the distance being below a threshold distance.

11. The method of claim 10, wherein the threshold distance is between 10 cm and 50 cm.

12. The method of claim 8, wherein the pairing responder device is not configured to communicate with an attestation server prior to the pairing operation.

13. The method of claim 8, wherein the pairing operation further includes:

generating a shared ranging key based on cryptographic identities of the pairing initiator device and the pairing responder device; and ranging, with the pairing initiator device using the shared ranging key to secure ranging communications, to determine a distance between the pairing responder device and the pairing initiator device.

14. The method of claim 8, further comprising subsequent to wirelessly pairing the pairing responder device with the pairing initiator device, sending, from the pairing initiator device to the pairing responder device, instructions to configure the pairing responder device.

15. The method of claim 8, further comprising:

prompting the user to bring the pairing initiator device within a threshold distance from the pairing responder device.

16. A pairing responder device comprising:

a computer processor system;

a cryptographic circuit;

a transceiver; and a computer memory storing instructions executable by the computer processor system to cause the pairing responder device to perform operations comprising:

receiving, from a pairing initiator device, a request to wirelessly pair with the pairing responder device;

generating, using the cryptographic circuit, a first cryptographic indicator useable by an attestation server to authenticate the pairing responder device;

sending, from the pairing responder device to the pairing initiator device, the first cryptographic indicator for retransmission to the attestation server by the pairing initiator device;

ranging, using the transceiver, with a transceiver of the pairing initiator device to determine a distance between the pairing responder device and the pairing initiator device; and based on the distance being below a threshold, wirelessly pairing the pairing responder device with the pairing initiator device without input from a user to the pairing responder device.

17. The pairing responder device of claim 16, wherein the cryptographic circuit is a secure circuit and stores a unique identifier that was determined prior to wirelessly pairing with the pairing initiator device.

18. The pairing responder device of claim 16, wherein prior to wirelessly pairing with the pairing initiator device, the pairing responder device is not configured to directly communicate with the attestation server.

19. The pairing responder device of claim 16, the operations further comprising:

receiving, from the pairing initiator device, commands to change one or more settings of the pairing responder device; and changing one or more settings of the pairing responder device based on the commands.

20. The pairing responder device of claim 16, wherein the operations further comprise:

generating, with the cryptographic circuit, a shared ranging key based on cryptographic identities of the pairing initiator device and the pairing responder device; and wherein the ranging is performed using the shared ranging key to secure ranging communications.

* * * * *